(12) United States Patent
Kerr et al.

(10) Patent No.: US 7,067,835 B2
(45) Date of Patent: Jun. 27, 2006

(54) HIGH SPEED SCANNING DEVICE FOR USE WITH RADIOGRAPHIC MEDIA

(75) Inventors: Roger S. Kerr, Brockport, NY (US); Seung-Ho Baek, Pittsford, NY (US); Thomas A. Mackin, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 237 days.

(21) Appl. No.: 10/745,316

(22) Filed: Dec. 22, 2003

(65) Prior Publication Data

US 2005/0133747 A1    Jun. 23, 2005

(51) Int. Cl.
    G03B 42/08    (2006.01)
(52) U.S. Cl. .................. 250/584; 250/586; 250/591
(58) Field of Classification Search .......... 250/584, 250/586, 591
    See application file for complete search history.

(56) References Cited

U.S. PATENT DOCUMENTS

| | | | |
|---|---|---|---|
| RE31,847 E | | 3/1985 | Luckey |
| 5,038,037 A | * | 8/1991 | Saotome ............. 250/583 |
| 5,530,259 A | * | 6/1996 | Arakawa ............. 250/584 |
| 5,533,142 A | * | 7/1996 | Takeo ............. 382/128 |
| 5,654,556 A | * | 8/1997 | Yasuda ............. 250/584 |
| 5,877,508 A | * | 3/1999 | Arakawa et al. ........ 250/588 |
| 6,355,938 B1 | * | 3/2002 | Cantu et al. ......... 250/584 |
| 6,740,898 B1 | * | 5/2004 | Yasuda ............. 250/587 |

* cited by examiner

*Primary Examiner*—Albert Gagliardi
(74) *Attorney, Agent, or Firm*—Baskop Law Group P.C.

(57) ABSTRACT

A high speed translation device for use with radiographic media with a scanning stage (10) adapted for movement in a first and second direction (11, 13) along a first axis (14); a second scanning module stage (12) disposed opposite the first scanning stage for movement in a third and fourth direction (15, 16) along a second axis (17); a first and a second scanning module mounted on the first and second scanning stages, respectively; a control processing unit (58) adapted to combine the scanned images from each scanning module; and a continuous drive cable (20) with a first pin (22) for sequentially moving the scanning stage from a first position (25) to a second position (27); a second pin (30) for moving the balancing stage simultaneously with the scanning stage initially in a third position (29) to the fourth position (31); wherein the first pin moves the balancing stage from the fourth position to the third position while second pin moves the scanning stage from the second position to the first position.

10 Claims, 7 Drawing Sheets

HIGH SPEED SCANNING DEVICE FOR USE WITH RADIOGRAPHIC MEDIA

CROSS REFERENCE TO RELATED APPLICATIONS

Reference is made to commonly-assigned copending U.S. patent application Ser. No. 10/744,538, filed Dec. 22, 2003, entitled A HIGH SPEED SCANNING DEVICE AND FILM WRITER FOR USE WITH RADIOGRAPHIC MEDIA, by Kerr et al.; and U.S. patent application Ser. No. 10/744,541, filed Dec. 22, 2003, entitled A HIGH SPEED COUNTER-BALANCED TRANSLATION DEVICE FOR USE WITH RADIOGRAPHIC MEDIA, by Kerr et al., the disclosures of which are incorporated herein.

FIELD OF THE INVENTION

The invention relates in general to radiography and in particular to scanning both sides of a phosphor plate simultaneously with two scanning heads.

BACKGROUND OF THE INVENTION

In a photo-stimulatable phosphor imaging system, as described in U.S. Pat. No. RE 31,847, a photo-stimulatable phosphor sheet is exposed to an image wise pattern of short wavelength radiation, such as x-radiation, to record a latent image pattern in the photo-stimulatable phosphor sheet. The latent image is read out by stimulating the phosphor with a relatively long wavelength stimulating radiation such as red or infrared light. Upon stimulation, the photo-stimulatable phosphor releases emitted radiation of an intermediate wavelength such as blue or violet light in proportion to the quantity of short wavelength radiation that was received. To produce a signal useful in electronic image processing, the photo-stimulatable phosphor sheet is scanned in a raster pattern by a beam of light to produced emitted radiation, which is sensed by a photo-detector such as a photo-multiplier tube to produce the electronic image signal. The signal is then transmitted to a separate device, a film writer, which reproduces the scanned image.

While the above system works well a need exists to improve image quality by scanning both sides of a radiographic media that has a continuous drive system so that the scanning rates are improved and the image quality improves.

SUMMARY OF THE INVENTION

An embodiment of the present invention is a high speed translation device for use with radiographic media. The translation device includes a first scanning stage adapted for movement in a first and second direction along a first axis and a second scanning stage disposed opposite the first scanning stage adapted for movement in a third and fourth direction along a second axis. The translation device also includes first and second scanning modules mounted on the first and second scanning stages, respectively. The translation device also has a continuous drive cable engaging a drive pulley with a drive motor for rotating the drive pulley.

The continuous drive cable on the translation device includes a first pin for sequentially moving the scanning stage in from a first to a second position by engaging the first scanning stage slot located in the scanning stage. A second pin in the continuous drive cable moves the balancing stage simultaneously with the scanning stage initially in a third position to the fourth position by engaging the balancing stage slot. In sequence, the first pin moves the balancing stage from the fourth position to the third position while second pin moves the scanning stage from the second position to the first position.

The high speed translation device also includes a control processing unit to combine the scanned images from each scanning module. The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with accompanying drawings.

DETAILED DESCRIPTION OF THE INVENTION

Figure 1:
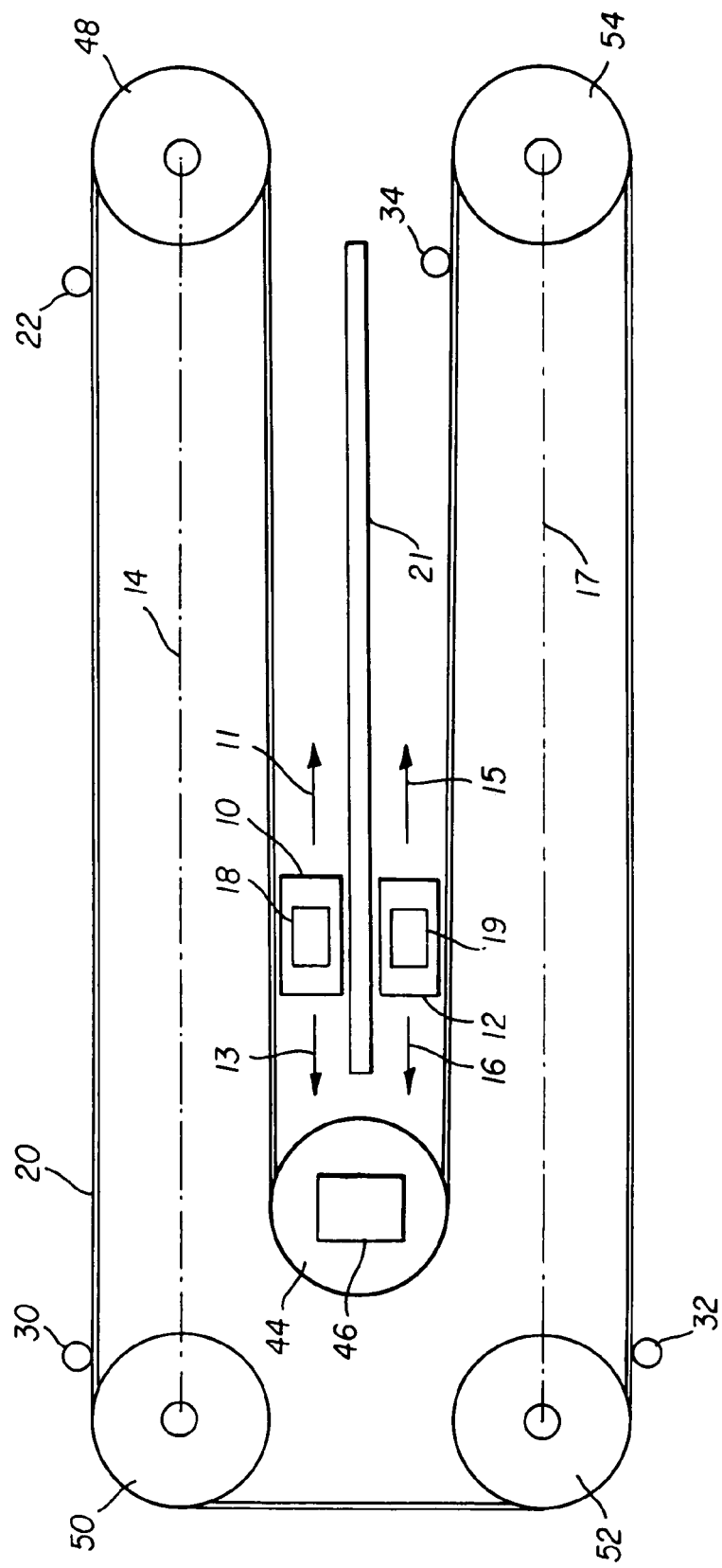
FIG. 1 is a schematic of the invention.

The present invention will be directed in particular to elements forming part of, or in cooperation more directly with the apparatus in accordance with the present invention. It is to be understood that elements not specifically shown or described may take various forms well known to those skilled in the art.

The invention was designed for creating higher image quality in scanned radiographic images while providing for a high speed, ultra stable scanning device. In a preferred embodiment, the radiographic images are a phosphorous plate. The invention includes a control processing unit to combine the scanned images from each scanning module.

Referring now to FIGS. 1 through 5, a first scanning stage 10 is adapted for movement in a first direction 11 and a second direction 13 along a first axis 14. A second scanning stage 12 is disposed opposite the first scanning stage in a balanced relationship, so that the movement of the second scanning stage balances the weight of the first scanning stage.

The second scanning stage moves in a third direction 15 and a fourth direction 16 along a second axis 17. It should be noted in the preferred embodiment, the first axis is parallel to the second axis.

A first scanning module 18 is mounted to the first scanning stage for scanning radiographic media 21 that is placed under the first scanning stage. The first scanning module sends a beam of light from a laser to the radiographic image. The scanner collects emitted light from the radiographic image and sends the emitted light to a control process unit for storage and compiling.

A second scanning module 19 is mounted to the second scanning stage to provide scanning from a second direction to cause bidirectional scanning of the same radiographic media. Preferably, the second scanning module is mounted so as to provide a counterbalance weight as well as the additional second scanning advantage in the device. In a preferred embodiment, the second scanning module is mounted beneath the radiographic media and the first scanning module is mounted above the radiographic media for bi-directional scanning.

Figure 2:
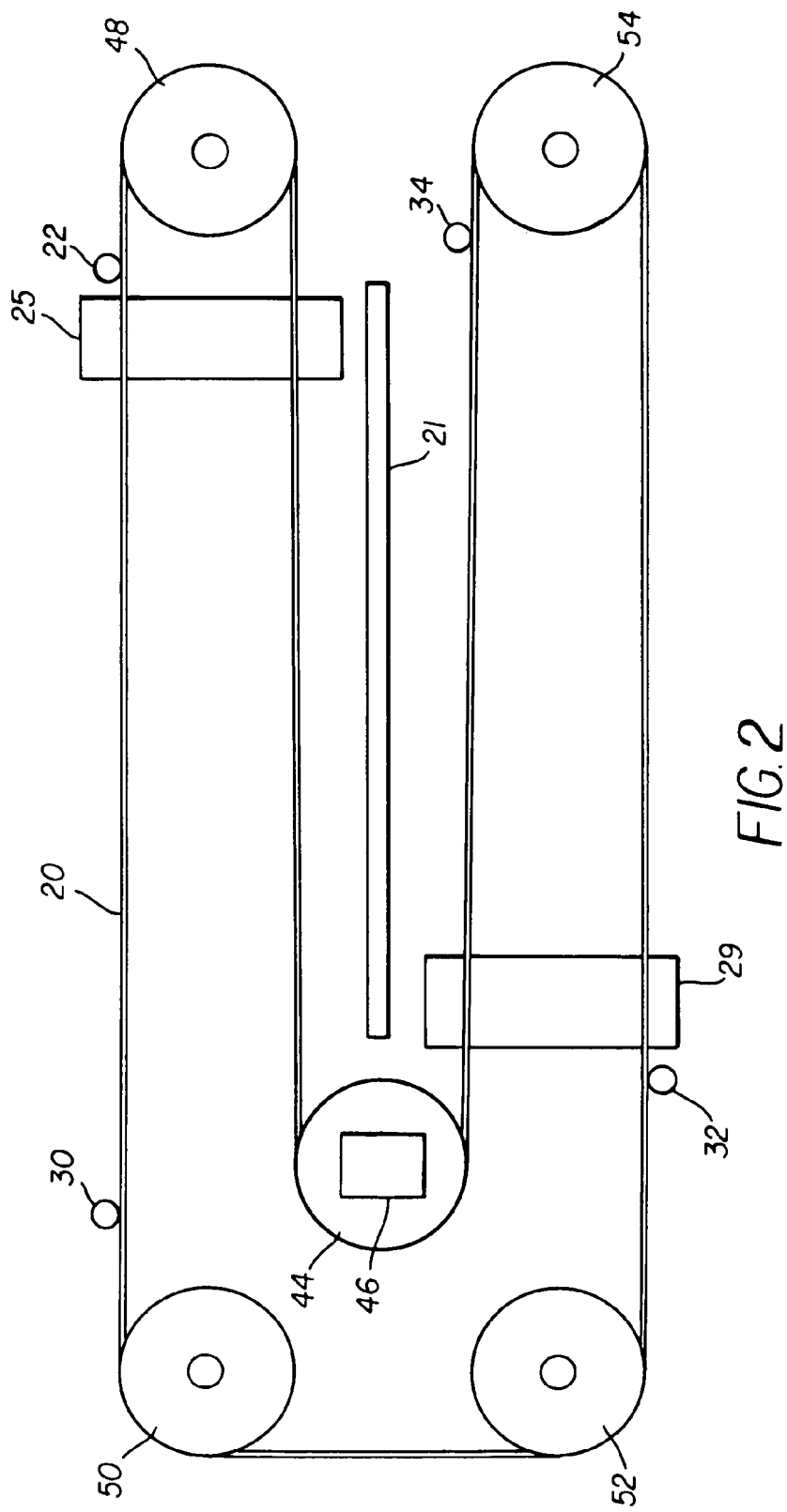
FIG. 2 is a schematic of the invention in the first and third positions.
Figure 3:
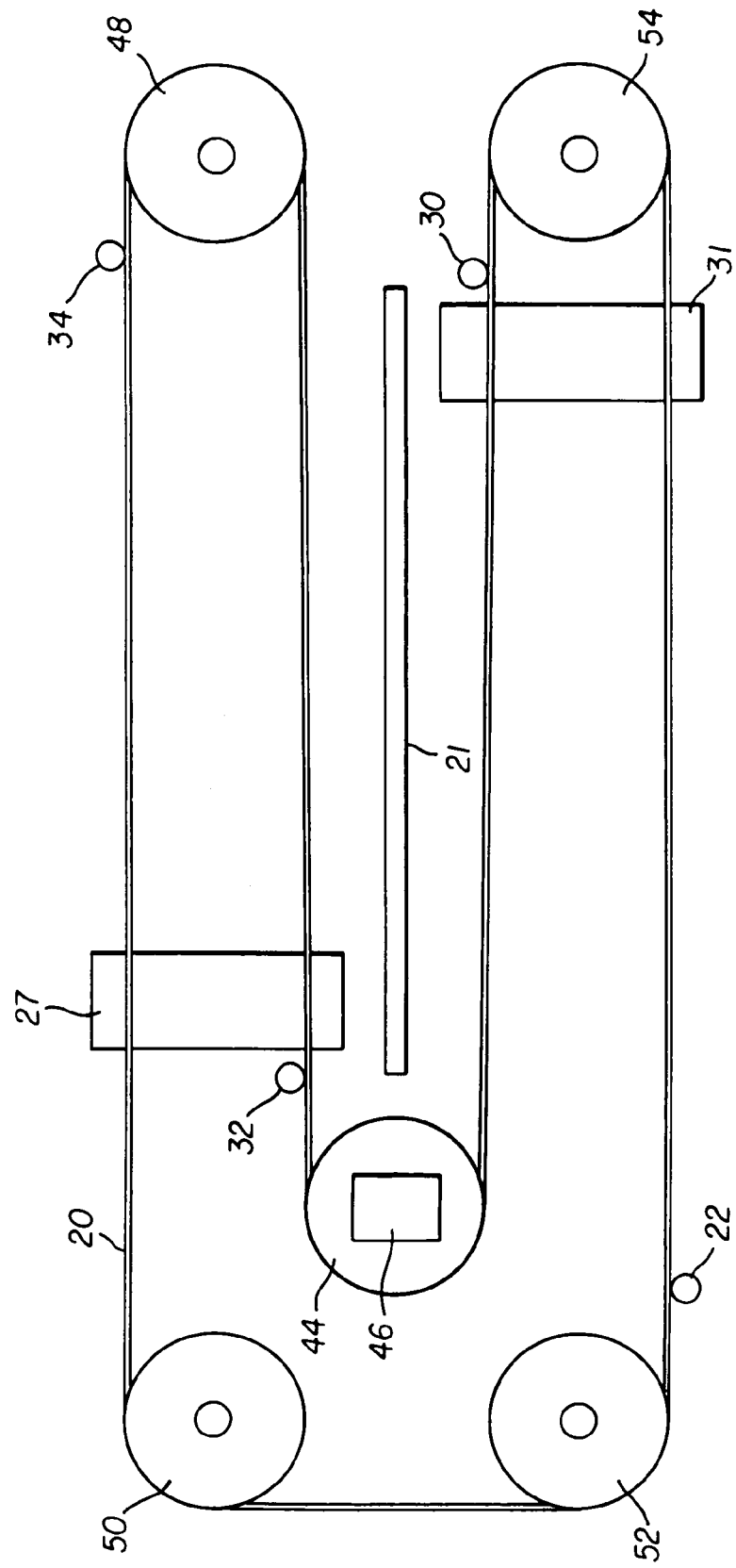
FIG. 3 is a schematic of the invention in the second and fourth positions.
Figure 4:
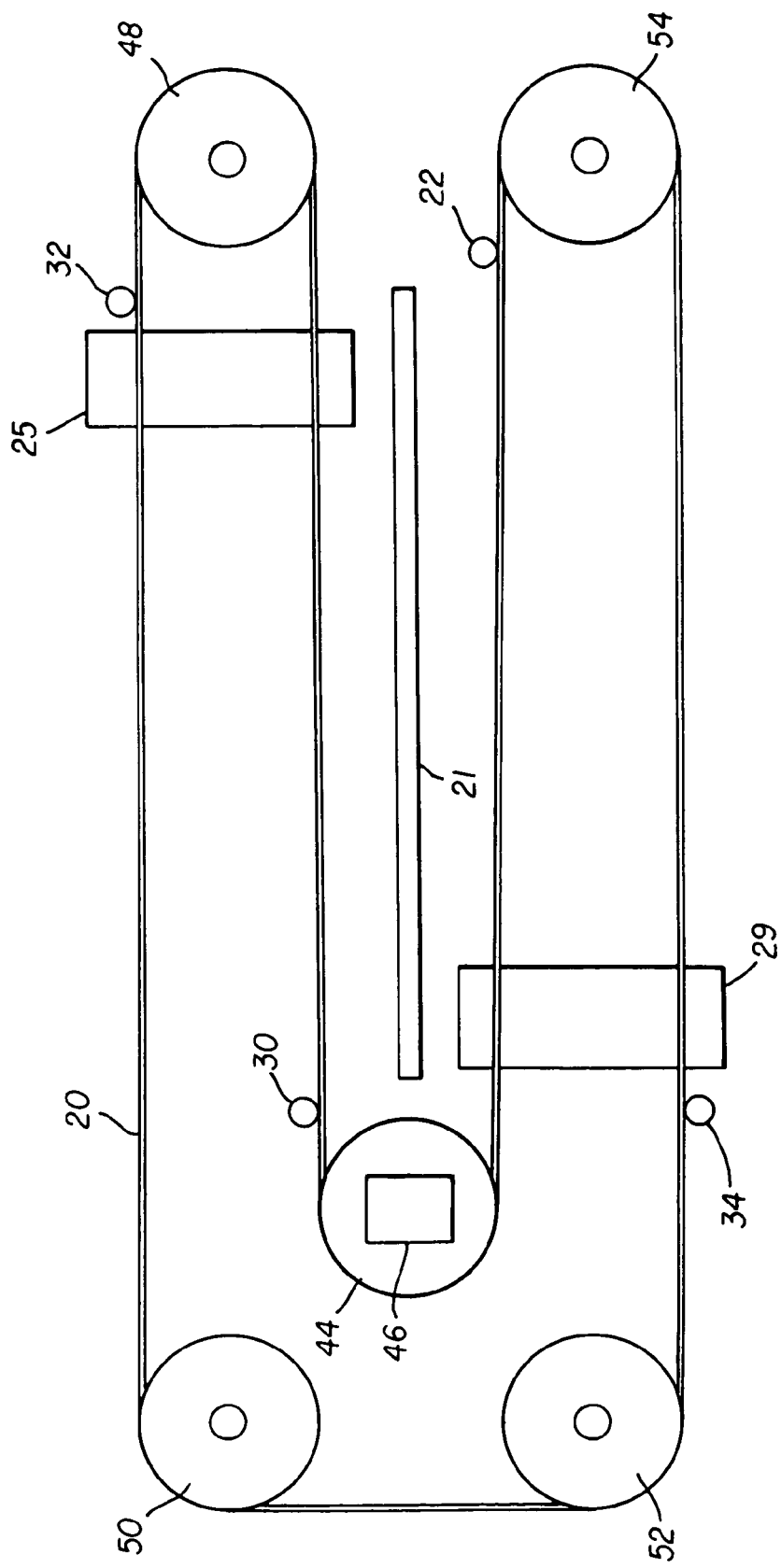
FIG. 4 is a schematic of the invention in the first and third positions.
Figure 5:
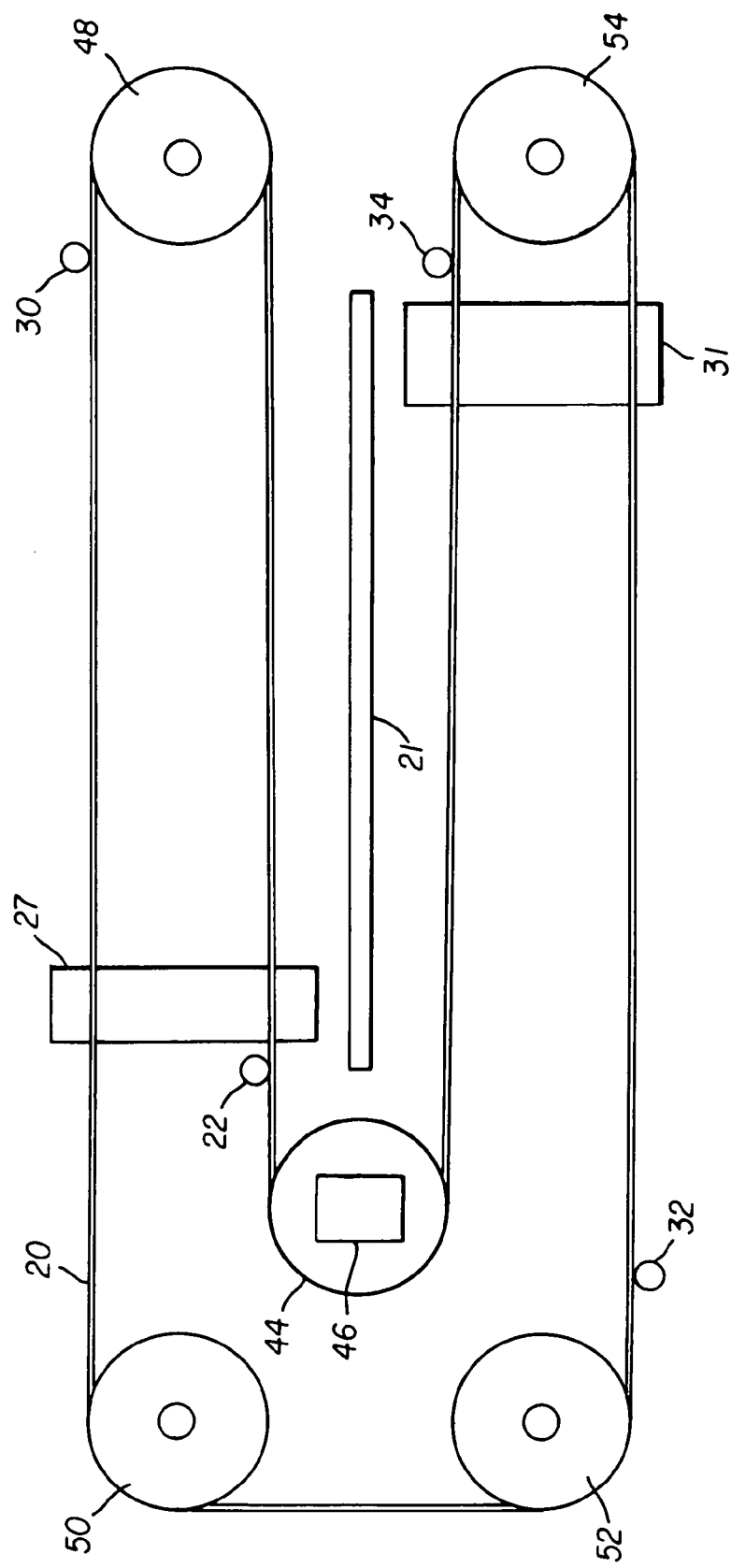
FIG. 5 is a schematic of the invention second and fourth positions.

FIG. 2 and FIG. 4 depict the first and second scanning stages 10 and 12 at the first and third positions 25 and 29, respectively. FIG. 3 and FIG. 5 depicts the first and second scanning stages 10 and 12 at the second and fourth positions 27 and 31, respectively. FIGS. 2 through 5 depict examples of the possible positions of the four pins 22, 30, 32, and 34 in moving the scanning stage 10 and 12.

The first and second scanning modules have a housing and a reflective center chamber, preferably a mirrored camber, in the housing that can have an elliptical or ellipsoid shape design. The module contains a laser that transmits a beam of light onto a radiographic plate, such as a phosphorous plate to create an image with a high sensitivity, around 0.7 mj/cm2, an image quality as good as 300 dpi, and a rate of productivity that is preferably between 80 plates per hour and 120 plates per hour. The module can have a small compact design, such as with a diameter of 15 mm to 23 mm, preferably 20 mm, and a length that creates as an ellipsoid with a surface calculated from the following formula:

$$(x2/9.64372)+(y2/9.64372)+((z-11)2/172)=1$$

The scanning module is adapted for emitting light to and collecting light from a photo-stimulatable radiographic sheet, such a phosphorous sheet or other similar radiographic sheet, filtering that light and then converting the light into a digital signal.

Figure 6:
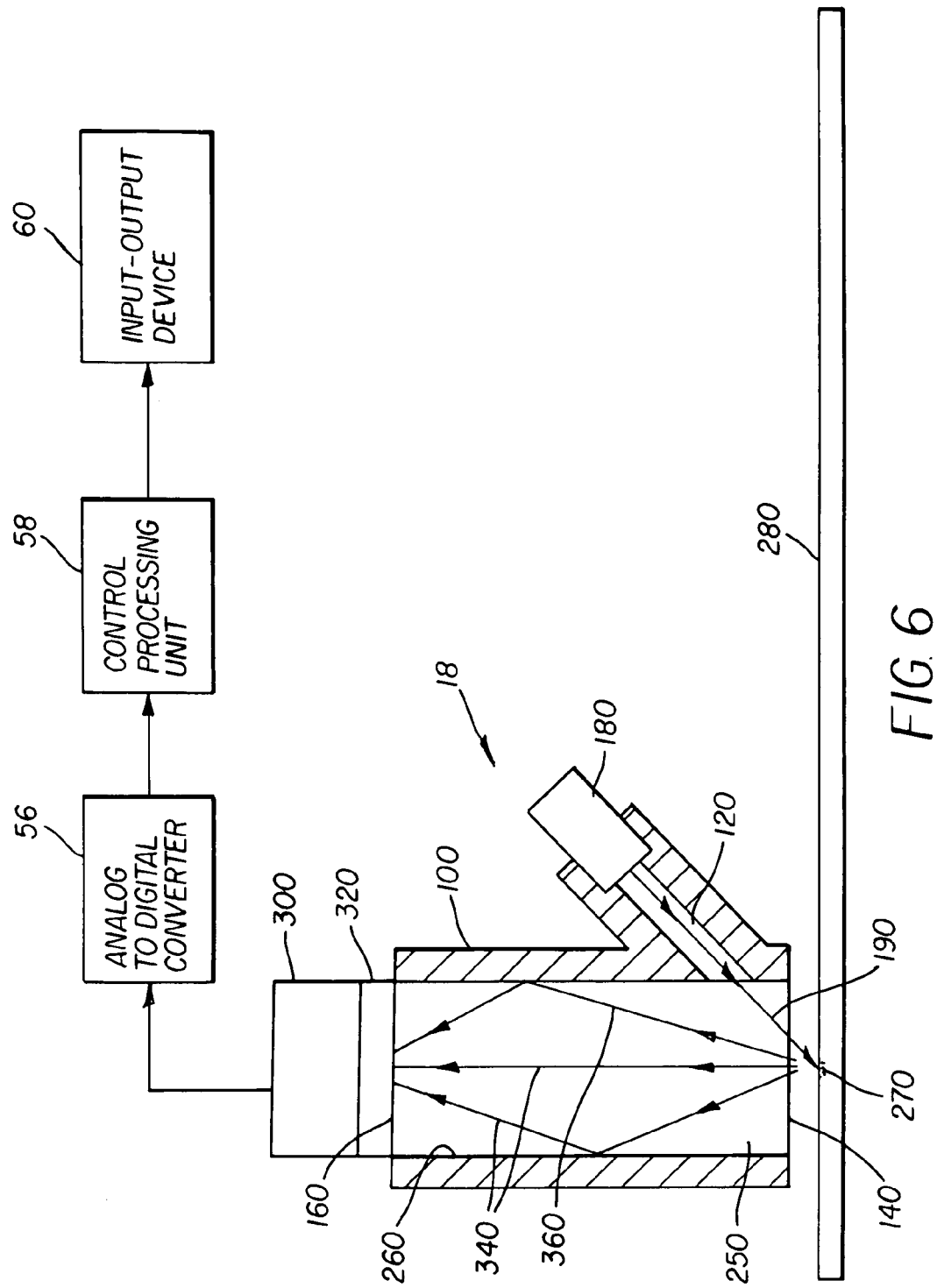
FIG. 6 depicts a side view of the scanning module.

FIG. 6 depicts the embodiment of a scanning module for emitting light to and collecting light from a photo-stimulatable radiographic sheet. The scanning module has a housing 100 with a channel 120 and the first and second openings 140 and 160. The scanning module also has cylindrical center chamber comprising a mirrored surface.

Within the housing 100, the scanning module has a laser 180 is oriented to generate a beam of stimulating electromagnetic radiation through the channel 120 into the first opening 140. The beam is preferably between 390 and 400 nm in size. The beam flows through the first opening 140 onto a stimulated spot 270 on a photo-stimulatable radiographic sheet 280. Light 340 is emitted from the stimulated spot and reflected light 360 bounces from the radiographic sheet 280 to enter the first opening 140. The emitted light 340 is then transmitted from the center channel out of the second opening 160 to the filter 320. The filter 320 only permits the light emitted from the stimulated spot 270 to pass to the light detector 300.

In a preferred embodiment, the center chamber 250 has the following dimensions: a length between 20 mm and 30 mm, preferably about 25 mm; a height between 20 mm and 25 mm, preferably about 20 mm; and a width between 20 mm and 25 mm, preferably about 20 mm.

Returning to FIG. 5, the light detector 300 is disposed in the second opening for receiving light from filter 320 also disposed at the second opening of the housing.

In the most preferred embodiment, the housing 100 can be a one-piece molded structure of a strong polycarbonate, a strong plastic, or a metal. A preferred overall dimension of the housing is a height of 54 mm, a width of 35 mm, and a length of 25 mm.

Alternatively, the housing 100 can be a two-piece construction. In the two-piece construction, the two halves can be joined by conventional attaching devices, such as a latch, welds, or one or more screws.

The integrated scanning module can be used for line scanning or swath scanning. To operate the module, a laser disposed in a housing emits a beam of light onto the graphic sheet. In the most preferred embodiment, one laser is used per module. It is contemplated that multiple housing can be connected together, in parallel to form a swath for scanning over multiple spots.

The beam, which is preferably from a Hitachi single mode 635 nm, 35 mW laser or alternatively a multi mode 635 nm, 100 mW laser could be used. The beam is directed at discrete spots on the radiographic plate that already contains latent images.

The beam stimulates the radiographic plate to produce light that is collected by the module, in a preferably cylindrical, ellipsoid shaped mirrored container. A minor amount of reflected light may be collected as well.

A blue filter is used to selectively pass only the light from the radiographic image to a light detector that is preferably a PMT device, (at least one photo-multiplier tube) or a solid state photodiode. The filter is of the type Hoya 390 or B 410 from Tokyo, Japan or alternatively Schott BG-1 or BG 3 filter available from Schott of Mainz, Germany.

The light detector, such as a PMT made by Hamamatsu or a photomultiplier type R7400U available from Japan, receives the filtered light and generates a signal. The signal is transmitted to an analog to digital converter is usable to provide a digital signal. The digital signal is then stored as an image frame in a control processor, such as a computer like a PC or MAC.

Next, the digital image can be processed depending on the needs of the user. For example, the digital image could then be printed on black and white X-Ray film.

The scanning modules are contemplated for use as an input scanner.

A two-pin method can drive the two stages. The invention contemplates that other configurations can also be used to drive the two stages. The figures depict an embodiment using four pins to drive the two stages.

In particular, a continuous drive cable 20, which can be a belt or a cable has a first pin 22 for simultaneously engaging with a first scanning stage slot disposed in the first scanning stage. The first pin 22 engaging the first scanning stage slot is pulled by the drive cable and the first pin then moves the first scanning stage from a first position 25 as shown in FIG. 3 to a second position 27.

The continuous drive cable 20 has a second pin 30 for simultaneously engaging with a second scanning stage slot while the first pin 22 is engaged with the first scanning stage slot 24. The first pin, as connected to the continuous drive cable 20 moves the first scanning stage in a direction opposite from the second pin as connected to the drive cable engaging the second scanning stage slot from a third position 29 to a fourth position 31.

The drive cable then can engage the second pin 30 with the second scanning stage via the second scanning stage slot and a third pin 32 engages the first scanning stage slot in the first scanning stage. The second pin 30 then moves the second scanning stage in a direction reverse from the fourth position 31 to the third position 29. The second pin moves the first scanning stage in a direction reverse direction from the second position to the first position. In this second movement, the third pin and second pin drive the two stages simultaneously.

The continuous drive cable 20 has a fourth pin 34 for engaging the second scanning stage slot and moving the second scanning stage from the third position 29 to the fourth position 31. Simultaneously with the movement of the second scanning stage using the fourth pin, the third pin engages the scanning stage slot and moves the first scanning stage from the first position 25 to the second position 27.

In the fourth cycle, the continuous drive cable 20 has the first pin engaging the first scanning stage slot and the fourth pin engages the second scanning stage. The first pin moves the first scanning stage from second position to the first position and the fourth pin moves the second scanning stage from the fourth position to the third position. The cycle then repeats itself.

The effect of these pin engagements in the stage slots using the drive cable is to achieve a smooth counterbalanced continuous motion of one stage relative to the other stage while providing continuous smooth scanning from at least two different direction.

A drive pulley 44 connects to a drive motor 46 for rotating the drive pulley and thereby moving the drive cable with the pins. Four idler pulleys, 48, 50, 52, and 54 can be used with the drive cable 20 to support motion of the drive cable.

The invention contemplates a two pin embodiment of the invention described above wherein a high speed scanning device is used. In this embodiment, the device has a first scanning stage having a first scanning stage slot. The first scanning stage is adapted for movement in a first direction and a second direction along a first axis. The device further has a second scanning stage having a second scanning stage slot. The second scanning stage is disposed opposite the first scanning stage and is adapted for movement in a third direction and a fourth direction along a second axis. Two (or more) scanning modules can be used, at least one on each scanning stage.

The continuous drive cable is connected to and engages a drive pulley with drive motor for rotating the drive pulley. The cable, which can be a belt includes: a first pin for sequentially moving the first scanning stage from a first position to a second position by engaging the first scanning stage slot, and a second pin for moving the second scanning stage simultaneously with first scanning stage from a third position to a fourth position by engaging the second scanning stage slot. Next, the first pin moves the second scanning stage from the fourth position to the third position while second pin moves the first scanning stage from the second position to the first position.

This embodiment contemplates that the first axis is parallel to the second axis.

Both embodiments of the invention contemplate that the speed of the scanning modules are the same, and between 10 inches per second and 80 inches per second, preferably 45 inches per second. It is possible that there could be a variation between the speed of the first scanning module and the second scanning module, and those speed would be controlled by the control process unit 58 that can be a the computer, to receives, compile and store the image signals from the modules. The control processing unit can be used to transmit the compiled images to an input-output device, such as a film writer or printer.

Figure 7:
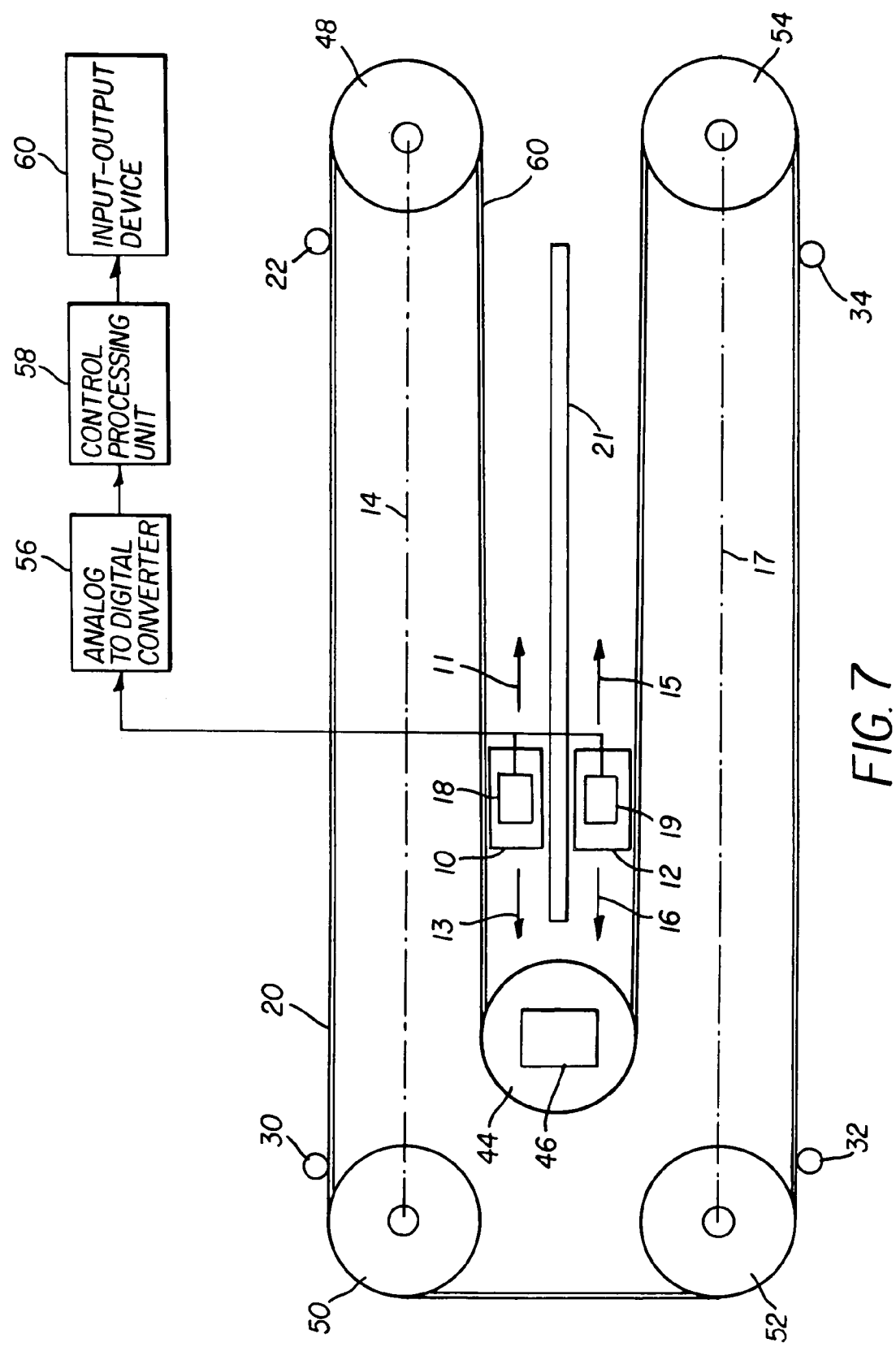
FIG. 7 depicts the system of the invention.

FIG. 7 depicts the preferred embodiment of the scanning system for use with radiographic media. The scanning system includes the high speed scanning device depicted in FIGS. 1 through 5 and described herein. The scanning system also includes an analog to digital converter 56, a control processing unit 58, and an input-output device 60. The scanned image from the high speed scanning device is sent to an analog to digital converter 56 that transmits the image to a control processing unit 58. The control processing unit 58, in turn, communicates the image to an output device 60. The output device 60 writes the image on media.

The invention has been described in detail with particular reference to certain preferred embodiments thereof, but it will be understood that variations and modifications can be effected within the scope of the invention.

PARTS LIST

10 first scanning stage
11 first direction
12 second scanning stage
13 second direction
14 first axis
15 third direction
16 fourth direction
17 second axis
18 first scanning module
19 second scanning module
20 drive cable
21 radiographic media
22 first pin
25 first position
27 second position
29 third position
30 second pin
31 fourth position
32 third pin
34 fourth pin
44 drive pulley
46 drive motor
48 first idler pulley
50 second idler pulley
52 third idler pulley
54 fourth idler pulley
56 analog to digital converter
58 control processing unit
60 input-output device
100 housing
120 channel
140 first opening
160 second opening
180 laser
190 beam
250 cylindrical center chamber
270 stimulated area or spot
280 radiographic sheet or media
300 light detector
320 filter
340 emitted light
360 reflected light

What is claimed is:

1. A high speed scanning device for use with radiographic media comprising:
    a) a first scanning stage comprising a first scanning stage slot, wherein the first scanning stage is adapted for movement in a first direction and a second direction along a first axis;
    b) a second scanning stage comprising a second scanning stage slot, wherein the second scanning stage is disposed on an opposite side of the radiographic media from the first scanning stage and is adapted for movement in a third direction and a fourth direction along a second axis;
    c) a first scanning module mounted on the first scanning stage;
    d) a second scanning module mounted to the second scanning stage;

e) a control processing unit adapted to combine the scanned images from the first and second scanning modules; and f) a continuous drive cable engaging a drive pulley with a drive motor for rotating the drive pulley, wherein the continuous drive cable further comprises:

i) a first pin for sequentially moving the first scanning stage from a first position to a second position by engaging the first scanning stage slot; and ii) a second pin for moving the second scanning stage simultaneously with the first scanning stage initially from a third position to a fourth position by engaging the second scanning stage slot; further, wherein, in sequence, the first pin moves the second scanning stage from the fourth position to the third position while the second pin moves the first scanning stage from the second position to the first position.

2. The device of claim 1 wherein the drive cable is a belt.

3. The device of claim 1 wherein the first axis is parallel to the second axis.

4. The device of claim 1 wherein four pins are used to move the two stages in a sequential manner.

5. The device of claim 1 wherein the speed of the scanning module is between 10 inches per second to 80 inches per second.

6. The device of claim 5 wherein the speed of each scanning module is 45 inches per second.

7. The device of claim 1 wherein the radiographic media is a phosphorous plate.

8. The device of claim 1 wherein the radiographic media is a sheet, a plate, a screen, or combinations thereof.

9. The device of claim 1 wherein the module comprises:

a) a housing comprising a channel; a cylindrical center chamber in communication with the channel comprising a mirrored surface; a first opening communicating with the cylindrical chamber; and a second opening communicating with the cylindrical chamber;

b) a laser is disposed in the housing and adapted to generate a beam of stimulating electromagnetic radiation through the channel and the first opening onto a stimulated area of the photo-stimulatable radiographic sheet, and wherein the stimulated spot emits light and reflected light to enter the first opening and the cylindrical chamber;

c) a light detector disposed in the second opening for receiving light emitted and reflected into the cylindrical chamber; and d) a filter disposed at the second opening of the housing for selectively passing only the emitted light from the stimulated area of the photo-stimulatable radiographic sheet to the light detector.

10. A scanning system for use with radiographic media comprising:

a) a high speed scanning device comprising:

i) a first scanning stage comprising a first scanning stage slot, wherein the first scanning stage is adapted for movement in a first direction and a second direction along a first axis;

ii) a second scanning stage comprising a second scanning stage slot, wherein the second scanning stage is disposed opposite the first scanning stage and is adapted for movement in a third direction and a fourth direction along a second axis;

iii) a first scanning module mounted on the first scanning stage;

iv) a second scanning module mounted to the second scanning stage;

v) a continuous drive cable engaging a drive pulley with drive motor for rotating the drive pulley, wherein the continuous drive cable further comprises:

vi) a first pin for sequentially moving the first scanning stage from a first position to a second position by engaging the first scanning stage slot; and vii) a second pin for moving the second scanning stage simultaneously with first scanning stage initially from a third position to a fourth position by engaging the second scanning stage slot; further, wherein, in sequence, the first pin moves the second scanning stage from the fourth position to the third position while the second pin moves the first scanning stage from the second position to the first position;

b) an analog to digital converter adapted to receive a signal from the light detector;

c) a control processing unit adapted to receive the signal from the analog to digital converter, wherein the control processing unit stores the signal; and d) an output device adapted to receive the signal from the control processing unit.

* * * * *